(12) United States Patent
Yi et al.

(10) Patent No.: US 11,115,837 B2
(45) Date of Patent: Sep. 7, 2021

(54) METHOD AND DEVICE FOR TRANSMITTING DATA UNIT, AND METHOD AND DEVICE FOR RECEIVING DATA UNIT

(71) Applicant: LG ELECTRONICS INC., Seoul (KR)

(72) Inventors: Seungjune Yi, Seoul (KR); Sunyoung Lee, Seoul (KR)

(73) Assignee: LG ELECTRONICS, INC., Seoul (KR)

( * ) Notice: Subject to any disclaimer, the term of this patent is extended or adjusted under 35 U.S.C. 154(b) by 289 days.

(21) Appl. No.: 16/082,520

(22) PCT Filed: Mar. 21, 2017

(86) PCT No.: PCT/KR2017/002991
§ 371 (c)(1),
(2) Date: Sep. 5, 2018

(87) PCT Pub. No.: WO2017/164603
PCT Pub. Date: Sep. 28, 2017

(65) Prior Publication Data
US 2019/0098512 A1    Mar. 28, 2019

Related U.S. Application Data

(60) Provisional application No. 62/313,149, filed on Mar. 25, 2016.

(51) Int. Cl.
*H04W 24/02*      (2009.01)
*H04L 5/00*       (2006.01)
(Continued)

(52) U.S. Cl.
CPC ............... *H04W 24/02* (2013.01); *H04L 5/00* (2013.01); *H04W 84/047* (2013.01); *H04L 1/16* (2013.01); *H04W 92/10* (2013.01); *Y02D 30/70* (2020.08)

(58) Field of Classification Search
CPC ............... H04W 72/042; H04W 28/06; H04W 36/0069; H04W 72/12; H04W 72/0453;
(Continued)

(56) References Cited

U.S. PATENT DOCUMENTS

2004/0151154 A1   8/2004   Wu
2010/0189059 A1*  7/2010   Yang ................... H04L 1/1809
                                                        370/329

(Continued)

OTHER PUBLICATIONS

PCT International Application No. PCT/KR2017/002991, Written Opinion of the International Searching Authority dated Jul. 20, 2017, 10 pages.
(Continued)

*Primary Examiner* — Romani Ohri
(74) *Attorney, Agent, or Firm* — Lee, Hong, Degerman, Kang & Waimey

(57) ABSTRACT

A radio link control (RLC) entity can be used for multiple radio bearers (RBs). In other words, one RLC entity can be associated with multiple packet data convergence protocol (PDCP) entities, where the multiple PDCP entities are associated with the multiple RBs, respectively. An identifier of a PDCP or RB can be provided with a PDCP PDU in order to inform the RLC entity or a receiving device which RB or which PDCP entity the PDCP PDU is associated with. The RLC entity shared by more than one RB can be configured according to configuration information for RB(s).

4 Claims, 9 Drawing Sheets

(51) Int. Cl.
*H04W 84/04* (2009.01)
*H04W 92/10* (2009.01)
*H04L 1/16* (2006.01)

(58) Field of Classification Search
CPC . H04W 28/02; H04W 28/0273; H04W 80/04; H04W 80/06; H04L 69/22; H04L 25/03866; H04L 2012/6448; H04L 47/10; H04L 29/0604; H04L 61/6022; H04L 63/164
See application file for complete search history.

(56) References Cited

U.S. PATENT DOCUMENTS

| | | | |
|---|---|---|---|
| 2010/0208632 | A1 | 8/2010 | Ray et al. |
| 2013/0294379 | A1* | 11/2013 | Guo .................. H04W 72/087 370/329 |
| 2014/0362829 | A1 | 12/2014 | Kazmi et al. |
| 2015/0181593 | A1* | 6/2015 | Kim .................. H04W 56/0045 370/329 |
| 2016/0094446 | A1* | 3/2016 | Kazmi ................ G01C 21/005 370/392 |
| 2017/0150393 | A1* | 5/2017 | Payer .................. H04L 41/5022 |
| 2017/0353914 | A1* | 12/2017 | Jung .................... H04W 48/18 |
| 2019/0021135 | A1* | 1/2019 | Jin ........................ H04W 88/04 |
| 2019/0069195 | A1* | 2/2019 | Makinen ................ H04L 47/24 |

OTHER PUBLICATIONS

Alapuranen, Sakari, "Performance Optimizations for LTE User-Plane L2 Software", Master's Thesis, Department of Computer Science and Engineering, University of Oulu, Apr. 2015, 67 pages.

\* cited by examiner (a) Control-Plane Protocol Stack (b) User-Plane Protocol Stack

METHOD AND DEVICE FOR TRANSMITTING DATA UNIT, AND METHOD AND DEVICE FOR RECEIVING DATA UNIT

TECHNICAL FIELD

The present invention relates to a wireless communication system, and more particularly, to a method and apparatus for transmitting/receiving a data unit.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication. In addition, a communication system design considering a service/UE sensitive to reliability and latency is being discussed. The introduction of next-generation RAT, which takes into account such advanced mobile broadband communication, massive MTC (mMCT), and ultra-reliable and low latency communication (URLLC), is being discussed.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, with development of smart devices, a new scheme for efficiently transmitting/receiving a small amount of data or efficiently transmitting/receiving data occurring at a low frequency is required.

Also, a method for transmitting/receiving signals effectively in a system supporting new radio access technology is required.

The technical objects that can be achieved through the present invention are not limited to what has been particularly described hereinabove and other technical objects not described herein will be more clearly understood by persons skilled in the art from the following detailed description.

Technical Solution

A radio link control (RLC) entity can be used for multiple radio bearers (RBs). In other words, one RLC entity can be associated with multiple packet data convergence protocol (PDCP) entities, where the multiple PDCP entities are associated with the multiple RBs, respectively, An identifier of a PDCP or RB can be provided with a PDCP PDU in order to inform the RLC entity or a receiving device which RB or which PDCP entity the PDCP PDU is associated with. The RLC entity shared by more than one RB can be configured according to configuration information for RB(s).

In one aspect of the present invention, there is a provided a method of transmitting, by a transmitting device, a data unit in a wireless communication system. The method comprises: receiving, at a shared radio link control (RLC) entity of the transmitting device, a first packet data convergence protocol (PDCP) protocol data unit (PDU) from a first PDCP entity configured for a first radio bearer (RB); and generating, at the shared RLC entity, a first RLC service data unit (SDU) from the first PDCP PDU; and submitting, at the shared RLC entity, a first RLC PDU containing the first RLC SDU to a medium access control (MAC) entity associated with the shared RLC entity. The shared RLC entity is associated with multiple PDCP entities. The first RLC PDU contains a first identifier associated with the first PDCP entity among the multiple PDCP entities. The first identifier is a PDCP identifier of the first PDCP entity or a RB identifier of the first RB.

In another aspect of the present invention, there is a provided a transmitting device for transmitting a data unit in a wireless communication system. The transmitting device comprises a radio frequency (RF) unit and a processor configured to control RF unit. The processor is configured to: receive, at a shared radio link control (RLC) entity, a first packet data convergence protocol (PDCP) protocol data unit (PDU) from a first PDCP entity configured for a first radio bearer (RB); and generate, at the shared RLC entity, a first RLC service data unit (SDU) from the first PDCP PDU; and submit, at the shared RLC entity, a first RLC PDU containing the first RLC SDU to a medium access control (MAC) entity associated with the shared RLC entity. The shared RLC entity is associated with multiple PDCP entities. The first RLC PDU contains a first identifier associated with the first PDCP entity. The first identifier is a PDCP identifier of the first PDCP entity or a RB identifier of the first RB.

In further an aspect of the present invention, there is a provided a method of receiving, by a receiving device, a data unit in a wireless communication system. The method comprises: receiving, at a shared radio link control (RLC) entity of the receiving device, a first RLC protocol data unit (PDU) containing a first RLC service data unit (SDU) from a medium access control (MAC) entity associated with the shared RLC entity; and delivering, at the shared RLC entity, the RLC SDU. The shared RLC entity is associated with multiple packet data convergence protocol (PDCP) entities. The first RLC PDU contains a first identifier identifying a PDCP entity. The first RLC SDU is delivered to the PDCP entity identified by the first identifier among the multiple PDCP entities. The first identifier is a PDCP identifier of the first PDCP entity or a RB identifier of the first RB.

In still further an aspect of the present invention, there is a provided a receiving device for receiving a data unit in a wireless communication system. The receiving device comprises a radio frequency (RF) unit and a processor configured to control RF unit. The processor is configured to: receive, by a shared radio link control (RLC) entity, a first RLC protocol data unit (PDU) containing a first RLC service data unit (SDU) from a MAC entity associated with the shared RLC entity; and deliver, by the shared RLC entity, the RLC SDU. The shared RLC entity is associated with multiple packet data convergence protocol (PDCP) entities. The first RLC PDU contains a first identifier identifying a PDCP entity. The first RLC SDU is delivered to the PDCP entity identified by the first identifier among the multiple PDCP entities. The first identifier is a PDCP identifier of the first PDCP entity or a RB identifier of the first RB.

In still further an aspect of the present invention, there is a provided a method of transmitting, by a transmitting device, a data unit in a wireless communication system. The method comprises: receiving configuration information for a first radio bearer (RB) from a network device; associating the first RB with a shared radio link control (RLC) entity preconfigured at the transmitting device if the configuration information is associated with the preconfigured shared RLC entity; and transmitting data of the first RB using the shared RLC entity.

In still further an aspect of the present invention, there is a provided a transmitting device for transmitting a data unit in a wireless communication system. The user equipment comprises a radio frequency (RF) unit and a processor configured to control RF unit. The processor is configured to: control the RF unit to receive configuration information for a first radio bearer (RB) from a network device; associate the first RB with a shared radio link control (RLC) entity preconfigured at the transmitting device if the configuration information is associated with the preconfigured shared RLC entity; and control the RF unit to transmit data of the first RB using the shared RLC entity.

wherein generating the first RLC SDU comprises attaching, by the shared RLC entity, the first identifier to the first PDCP PDU to generate the first RLC SDU.

In each aspect of the present invention, the first RLC PDU may include an indicator indicating presence of the first identifier. The indicator may be in a header of the first PDCP PDU or a header of the first RLC PDU.

In each aspect of the present invention, the transmitting device may transmit a message containing the first RLC PDU to the receiving device. The receiving device may receive the message containing the first RLC PDU from the transmitting device.

In each aspect of the present invention, the transmitting device may be a network device. If the transmitting device is a network device, the multiple PDCP entities may be located at different central units of the network device, respectively, and the shared RLC entity and the MAC entity may be located at a remote unit of the network device.

In each aspect of the present invention, the transmitting device may be a user equipment. If the transmitting device is a user equipment, the transmitting device may receive configuration information for a second RB from a receiving device and associate the first RB with the shared RLC entity if the configuration information is associated with the shared RLC entity preconfigured at the UE.

In each aspect of the present invention, the transmitting device may establish a new RLC entity for the first RB if configuration information for the first RB is not associated with any RLC entity preconfigured at the UE.

In each aspect of the present invention, the configuration information for the first RB may include at least to use the preconfigured shared RLC entity, an identifier of the preconfigured shared RLC entity or identifier(s) of RB(s) using the preconfigured shared RLC entity.

In each aspect of the present invention, the transmitting device may receive removal information for a second RB; and remove the second RB without releasing an RLC entity associated with the second RB if the RLC entity associated with the second RB is used for another RB, and release the RLC entity when removing the second RB if the RLC entity associated with the second RB is used for no other RB.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, radio communication signals can be efficiently transmitted/received. Therefore, overall throughput of a radio communication system can be improved.

According to one embodiment of the present invention, a low cost/complexity UE can perform communication with a base station (BS) at low cost while maintaining compatibility with a legacy system.

According to one embodiment of the present invention, the UE can be implemented at low cost/complexity.

According to one embodiment of the present invention, the UE and the BS can perform communication with each other at a narrowband.

According to an embodiment of the present invention, delay/latency occurring during communication between a user equipment and a BS may be reduce.

Also, it is possible to efficiently transmit/receive a small amount of data for smart devices, or efficiently transmit/receive data occurring at a low frequency.

Also, signals in a new radio access technology system can be transmitted/received effectively.

According to an embodiment of the present invention, a small amount of data may be efficiently transmitted/received.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

MODE FOR INVENTION

Figure 1:
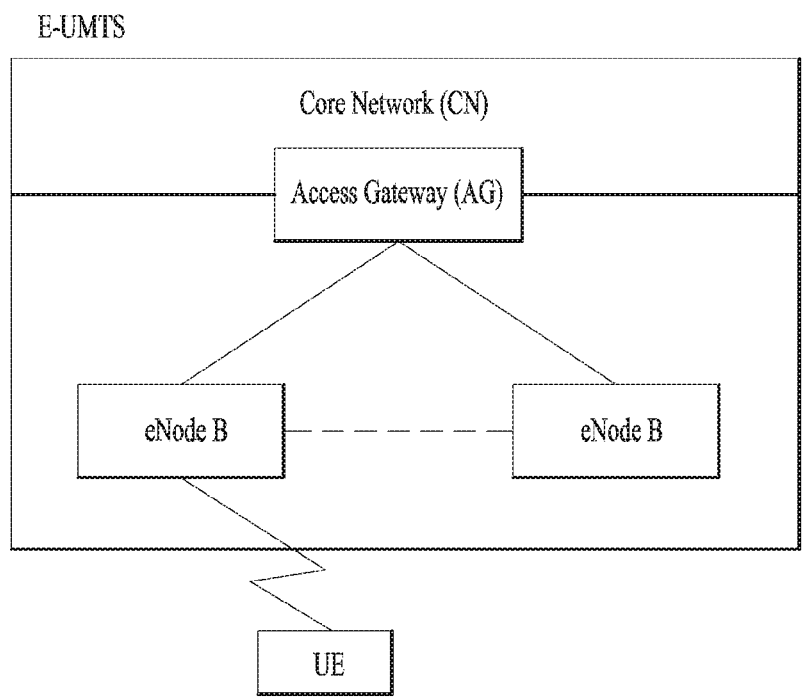
FIG. 1 is a view schematically illustrating a network structure of an E-UMTS as an exemplary radio communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, the term "assume" may mean that a subject to transmit a channel transmits the channel in accordance with the corresponding "assumption." This may also mean that a subject to receive the channel receives or decodes the channel in a form conforming to the "assumption," on the assumption that the channel has been transmitted according to the "assumption."

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP LTE-A standard uses the concept of a cell to manage radio resources. The "cell" associated with the radio resources is defined by combination of downlink resources and uplink resources, that is, combination of DL component carrier (CC) and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

For terms and technologies which are not specifically described among the terms of and technologies employed in this specification, 3GPP LTE/LTE-A standard documents, for example, 3GPP TS 36.211, 3GPP TS 36.212, 3GPP TS 36.213, 3GPP TS 36.321, 3GPP TS 36.322, 3GPP TS 36.323 and 3GPP TS 36.331 may be referenced.

Figure 2:
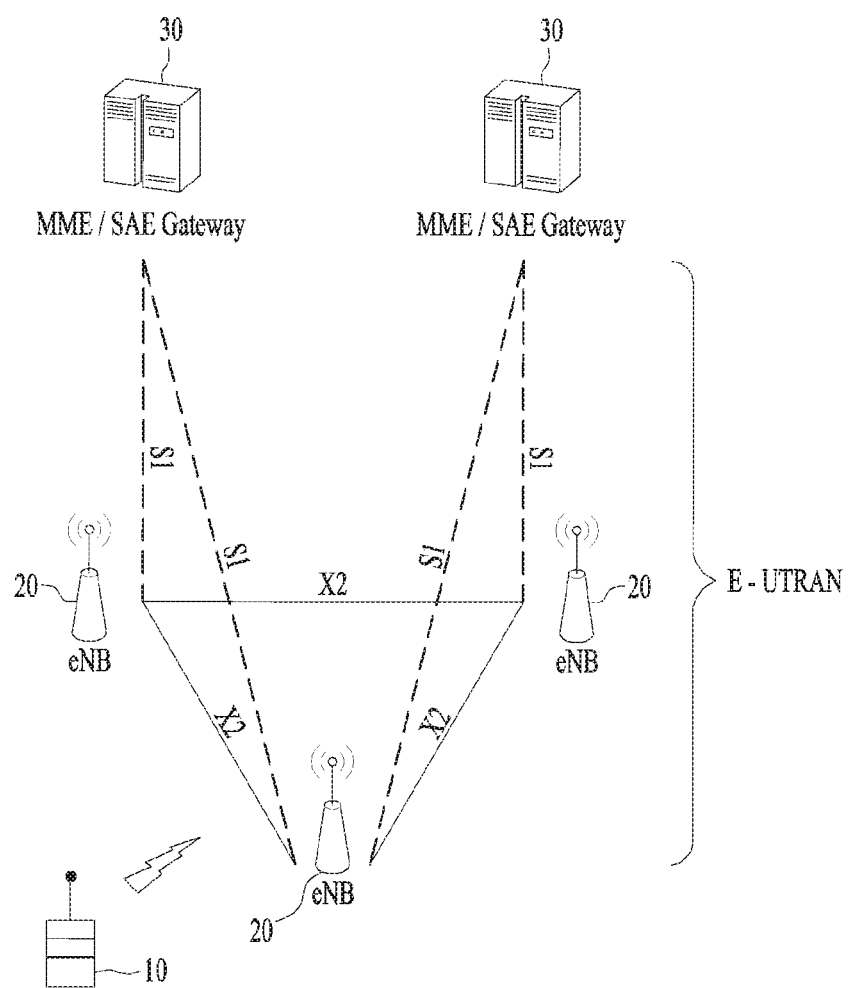
FIG. 2 is a block diagram illustrating network structure of an evolved universal mobile telecommunication system (E-UMTS).

FIG. 2 is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNB 20 to UE 10, and "uplink" refers to communication from the UE to an eNB.

Figure 3:
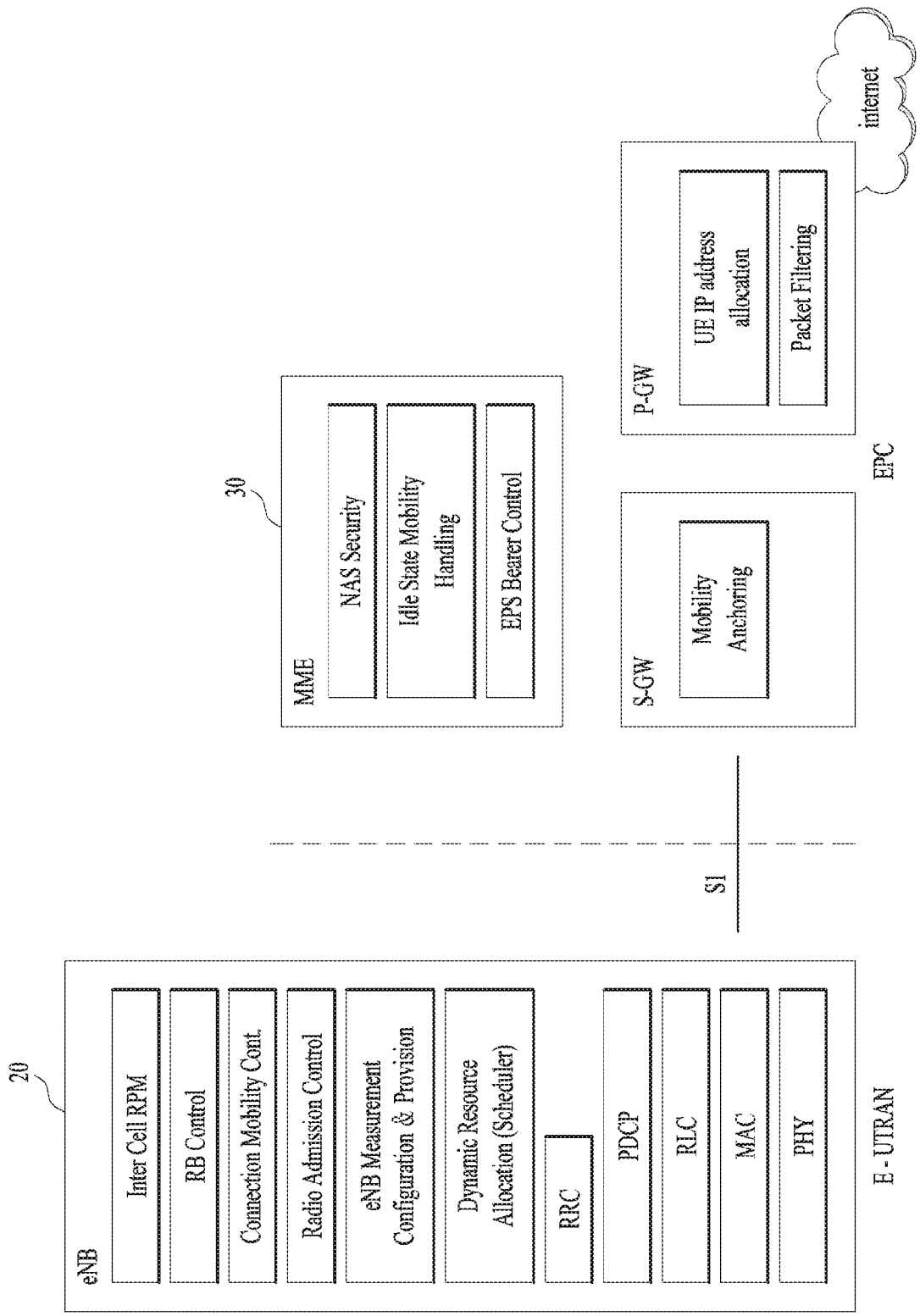
FIG. 3 is a block diagram depicting architecture of a typical E-UTRAN and a typical EPC.

FIG. 3 is a block diagram depicting architecture of a typical E-UTRAN and a typical EPC.

As illustrated in FIG. 3, an eNB 20 provides end points of a user plane and a control plane to the UE 10. MME/SAE gateway 30 provides an end point of a session and mobility management function for UE 10. The eNB and MME/SAE gateway may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including NAS signaling to eNBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, roaming, authentication, bearer management functions including dedicated bearer establishment, support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighboring eNBs may have a meshed network structure that has the X2 interface.

As illustrated, eNB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 4:
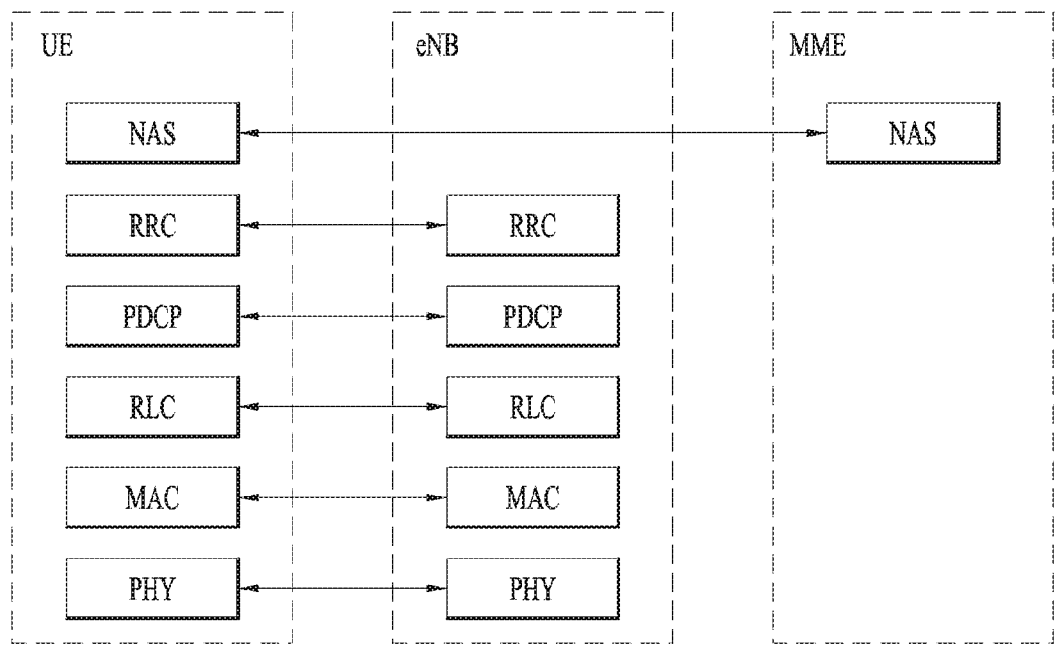
FIG. 4 is a diagram showing a control plane and a user plane of a radio interface protocol between a UE and an E-UTRAN based on a 3GPP radio access network standard.
Figure 4:
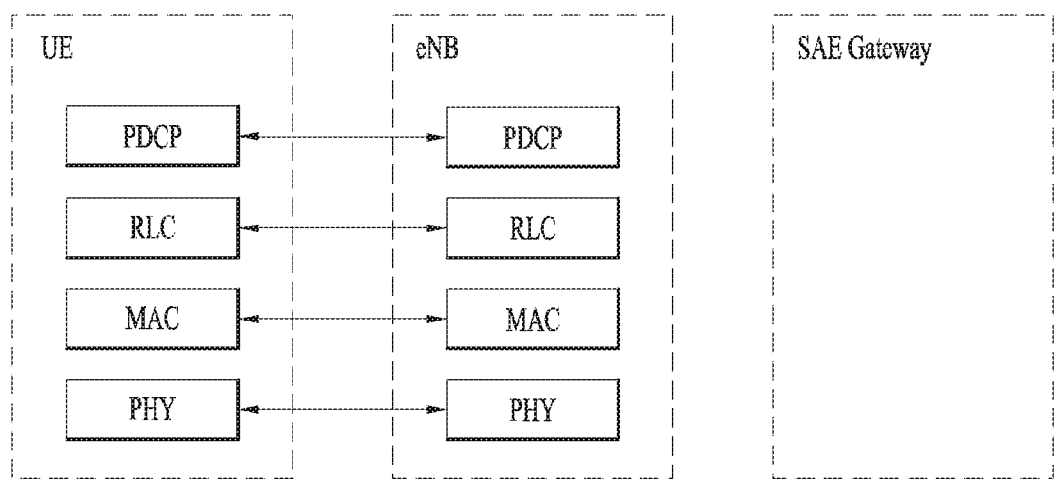

FIG. 4 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 5:
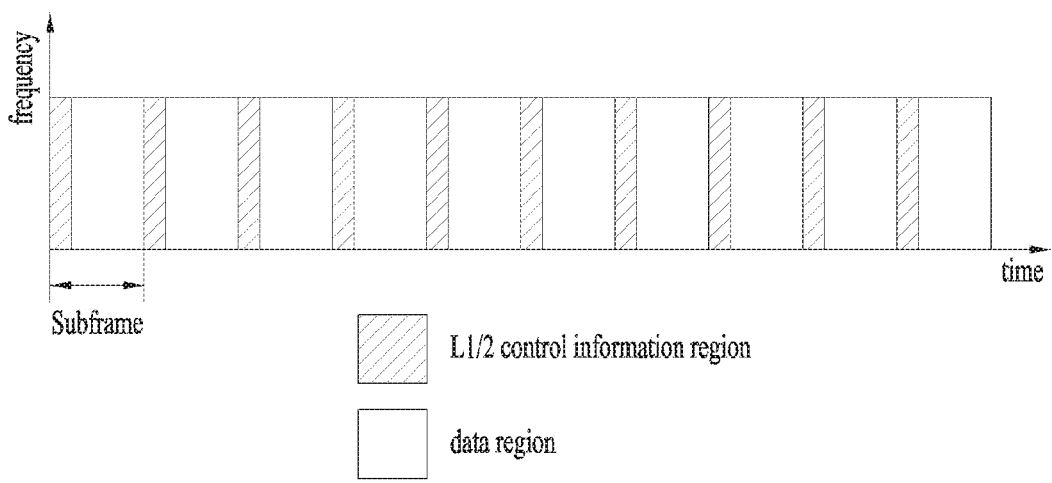
FIG. 5 is a view showing an example of a physical channel structure used in an E-UMTS system.

FIG. 5 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 5, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

A time interval in which one subframe is transmitted is defined as a transmission time interval (TTI). Time resources may be distinguished by a radio frame number (or radio frame index), a subframe number (or subframe index), a slot number (or slot index), and the like. TTI refers to an interval during which data may be scheduled. For example, in the current LTE/LTE-A system, a opportunity of transmission of an UL grant or a DL grant is present every 1 ms, and the UL/DL grant opportunity does not exists several times in less than 1 ms. Therefore, the TTI in the current LTE/LTE-A system is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

A fully mobile and connected society is expected in the near future, which will be characterized by a tremendous amount of growth in connectivity, traffic volume and a much broader range of usage scenarios. Some typical trends include explosive growth of data traffic, great increase of connected devices and continuous emergence of new services. Besides the market requirements, the mobile communication society itself also requires a sustainable development of the eco-system, which produces the needs to further improve system efficiencies, such as spectrum efficiency, energy efficiency, operational efficiency and cost efficiency. To meet the above ever-increasing requirements from market and mobile communication society, next generation access technologies are expected to emerge in the near future.

Work has started in ITU and 3GPP to develop requirements and specifications for new radio (NR) systems, as in the Recommendation ITU-R M.2083 "Framework and overall objectives of the future development of IMT for 2020 and beyond", as well as 3GPP SA1 study item New Services and Markets Technology Enablers (SMARTER) and SA2 study item Architecture for NR System. It is required to identify and develop the technology components needed for successfully standardizing the NR system timely satisfying both the urgent market needs, and the more long-term requirements set forth by the ITU-R IMT-2020 process. In order to achieve this, evolutions of the radio interface as well as radio network architecture have to be considered in the "New Radio Access Technology."

Figure 6:
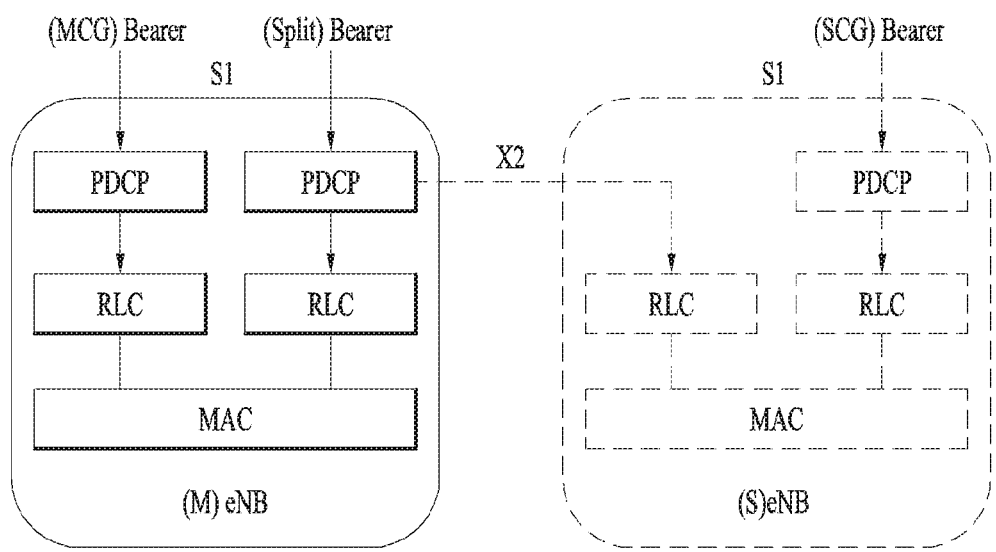
FIG. 6 illustrates a radio protocol architecture in the LTE/LTE-A system.

FIG. 6 illustrates a radio protocol architecture in the LTE/LTE-A system.

Referring to FIG. 6, in view of one eNB, there is 1 PDCP entity and 1 RLC entity configured for 1 radio bearer. In other words, in the LTE/LTE-A system, one RLC entity is connected to one PDCP entity, and used for only one radio bearer.

Meanwhile, E-UTRAN supports dual connectivity (DC) operation whereby a multiple Rx/Tx UE in RRC_CONNECTED is configured to utilize radio resources provided by two distinct schedulers, located in two eNBs connected via a non-ideal backhaul over the X2 interface. The overall E-UTRAN architecture as depicted in FIG. 2 is applicable for DC as well. eNBs involved in DC for a certain UE may assume two different roles: an eNB may either act as a master eNB (MeNB) or as a secondary eNB (SeNB). The MeNB terminates at least S1-MME, and the SeNB is providing additional radio resources for the UE but is not the MeNB. If UE is configured with DC, the UE is connected to one MeNB and one SeNB, and configured with a master cell group (MCG) and a secondary cell group (SCG). The MCG is a group of serving cells associated with the MeNB, comprising of the PCell and optionally one or more SCells, and the SCG is a group of serving cell associated with, comprising of a primary SCell (PSCell) optionally one or more SCells. In DC, the radio protocol architecture that a particular bearer uses depends on how the bearer is setup. Three bearer types exist: MCG bearer, SCG bearer and split bearer. Those three bearer types are depicted on FIG. 6. RRC is located in MeNB and SRBs are always configured as MCG bearer type and therefore only use the radio resources of the MeNB. Similar to the case where a UE is not configured with DC, one RLC entity is connected to one PDCP entity, and used for only one radio bearer even when the UE is configured with DC.

Figure 7:
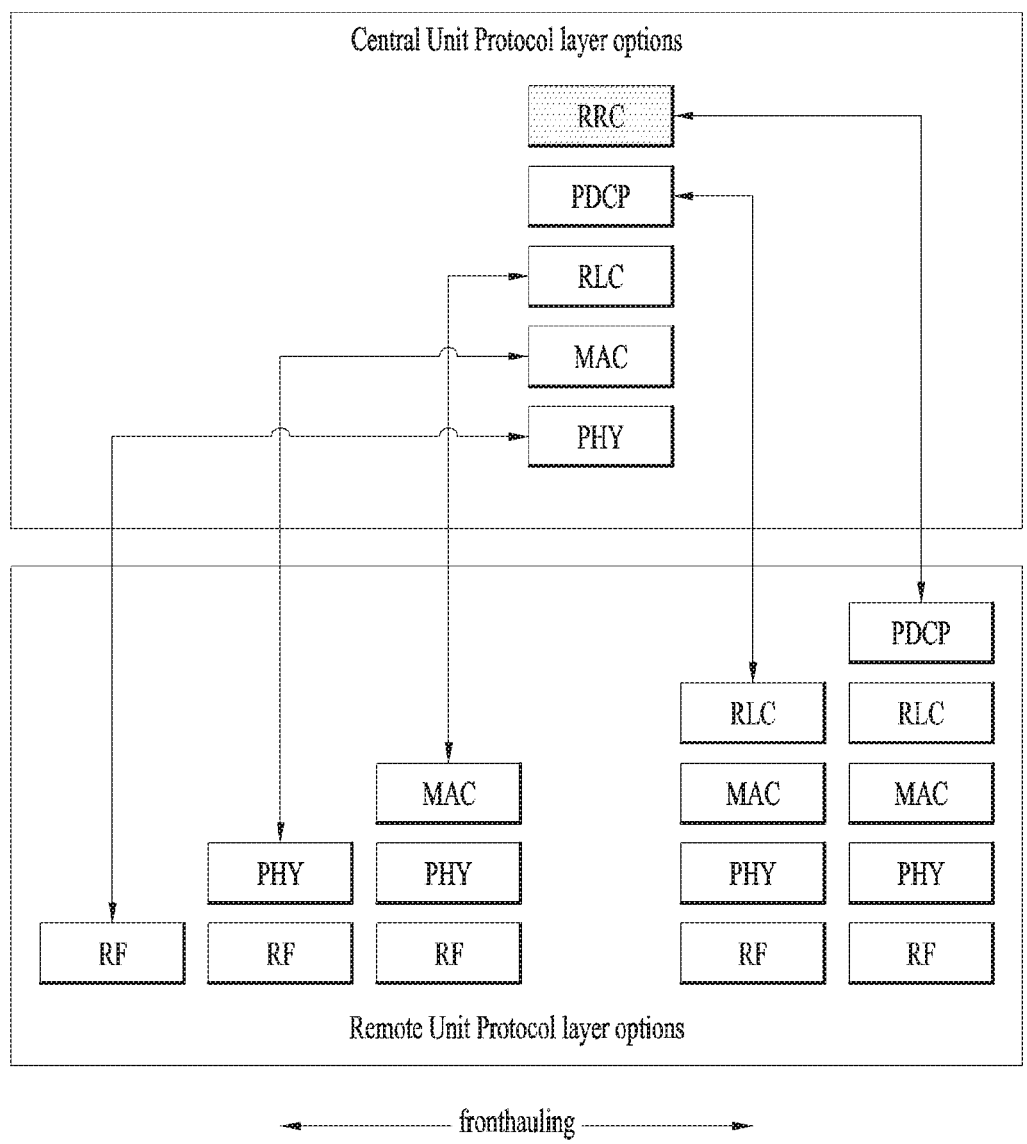
FIG. 7 illustrates examples of functional spilt options between protocol layers in the next generation system.

FIG. 7 illustrates examples of functional spilt options between protocol layers in the next generation system.

The concept of backhaul is used in the LTE/LTE-A system. The backhaul, at its simplest, links the mobile network back to the wired network. In the 5G new radio access technology (New RAT), the concept of fronthauling is introduced. The fronthauling indicates the transport capabilities and interfaces between internal RAN nodes, currently not specified by 3GPP. The fronthauling means that the standardized interface between radio protocol layers. The basic example of fronthauling is the connection and consequent transport functionality between a central unit and a remote unit. A central unit includes full/partial baseband functions and higher layer control functions. It handles multiple cells and serves as a function pool. A remote unit may include the functions of traditional remote radio units and possibly partial baseband functions. For fronthauling, different functional split options are considered. FIG. 7 shows candidate fronthauling options dependent on the function splits between a central unit and remote unit, as well as possible implementation/deployment of multiple fronthauling in one network.

Consequently, it is possible that different protocol layers can be located in different network nodes. For example, a PDCP entity may be located in central unit, while a RLC entity associated with the PDCP entity may be located in remote unit. Moreover, one remote unit may be connected with multiple central units. In other words, one remote unit can be shared between multiple central units.

Figure 8:
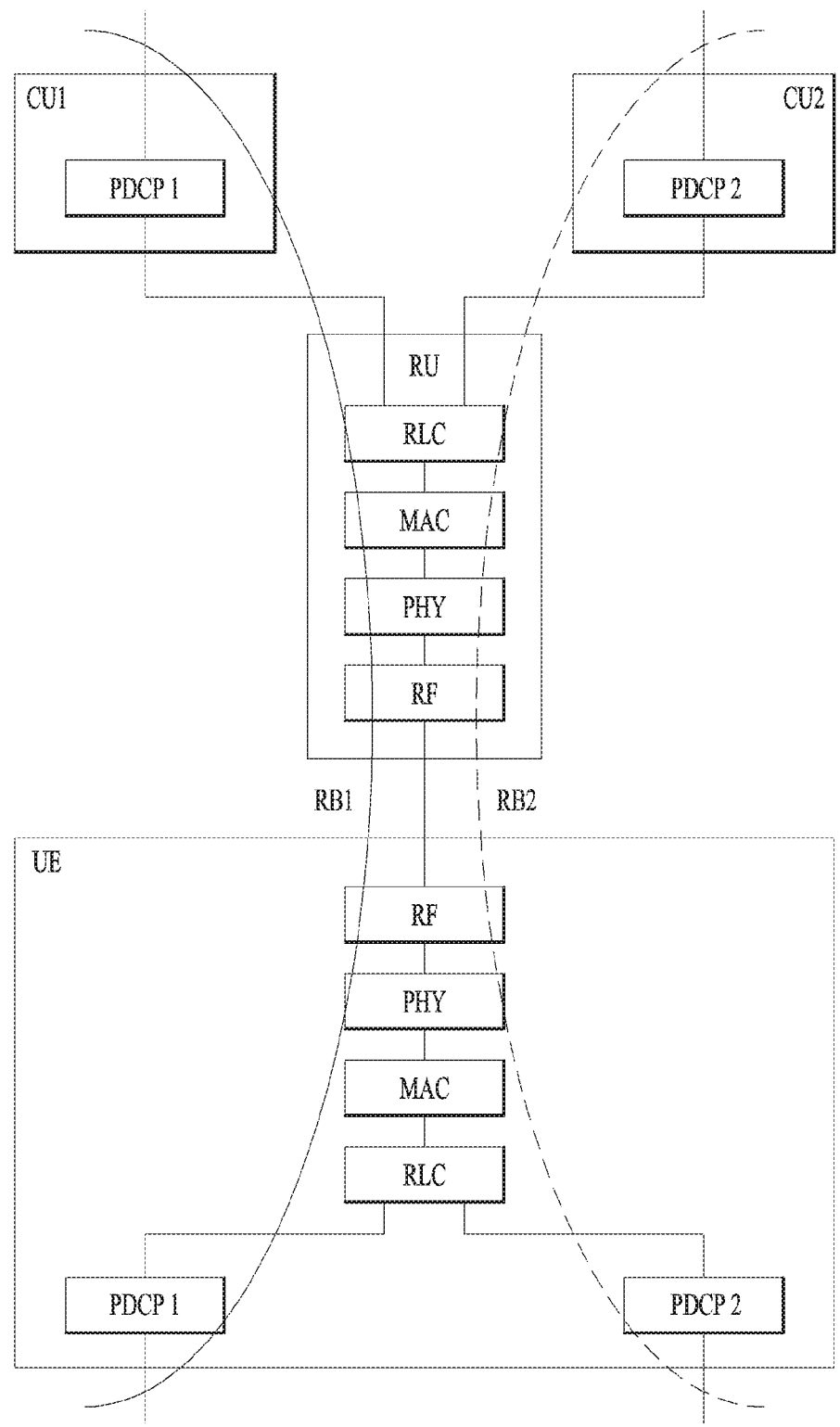
FIG. 8 illustrates a radio link control (RLC) entity according to the present invention.

FIG. 8 illustrates a radio link control (RLC) entity according to the present invention.

For the efficient use of a shared remote unit, and for the efficient use of radio resource, the present invention proposes that multiple radio bearers use the same RLC/MAC/PHY/RF. In other words, according to the present invention, multiple PDCP entities, which are corresponding to multiple radio bearers, respectively, can be connected to a single RLC entity. Hereinafter, an RLC entity connected with multiple PDCP entities or shared by multiple radio bearers is referred to as a shared RLC entity.

Referring to FIG. 8, in the network side, the PDCP entities may be located in different central units (CUs), and the RLC entity associated with the PDCP entities may be located in a remote unit (RU). The RLC entity is connected to the PDCP entities via the "fronthaul".

In the UE side, all protocol layers are located in the UE, and there may be no standardized interface between protocol layers.

The MAC/PHY/RF may be shared by multiple radio bearers (RBs), i.e., multiple RLC entities may be connected to one MAC entity. For example, a MAC entity may be connected to multiple shared RLC entities, where each RLC entity is used by one or more RBs.

The present invention proposes a method/device for allowing an RLC to be shared by multiple PDCPs or multiple RBs.

The PDCP entities are located in the PDCP sublayer. Several PDCP entities may be defined for a UE. Each PDCP entity carrying user plane data may be configured to use header compression. Each PDCP entity is carrying the data of one radio bearer. In this version of the specification, only the robust header compression protocol (ROHC), is supported. Every PDCP entity uses at most one ROHC compressor instance and at most one ROHC decompressor instance. A PDCP entity is associated either to the control plane or the user plane depending on which radio bearer it is carrying data for.

In the current LTE/LTE-A system, the main functions of the PDCP are as follows:

Header compression;
Security, i.e. integrity protection and ciphering; and
Service data unit (SDU) discard.

The detailed description of each function of the PDCP may refer to the document 3GPP TS 36.323.

RRC is generally in control of the RLC configuration. Functions of the RLC sub layer are performed by RLC entities. For a RLC entity configured at the eNB, there is a peer RLC entity configured at the UE and vice versa. An RLC entity receives/delivers RLC SDUs from/to upper layer and sends/receives RLC PDUs to/from its peer RLC entity via lower layers. An RLC PDU can either be a RLC data PDU or a RLC control PDU. If an RLC entity receives RLC SDUs from upper layer, it receives them through a single SAP between RLC and upper layer, and after forming RLC data PDUs from the received RLC SDUs, the RLC entity delivers the RLC data PDUs to lower layer through a single logical channel. If an RLC entity receives RLC data PDUs from lower layer, it receives them through a single logical channel, and after forming RLC SDUs from the received RLC data PDUs, the RLC entity delivers the RLC SDUs to upper layer through a single service access point (SAP) between RLC and upper layer. If an RLC entity delivers/receives RLC control PDUs to/from lower layer, it delivers/receives them through the same logical channel it delivers/receives the RLC data PDUs through. An RLC entity can be configured to perform data transfer in one of the following three modes: Transparent Mode (TM), Unacknowledged Mode (UM) or Acknowledged Mode (AM). Consequently, an RLC entity is categorized as a TM RLC entity, an UM RLC entity or an AM RLC entity depending on the mode of data transfer that the RLC entity is configured to provide. A TM RLC entity is configured either as a transmitting TM RLC entity or a receiving TM RLC entity. The transmitting TM RLC entity receives RLC SDUs from upper layer and sends RLC PDUs to its peer receiving TM RLC entity via lower layers. The receiving TM RLC entity delivers RLC SDUs to upper layer and receives RLC PDUs from its peer transmitting TM RLC entity via lower layers. An UM RLC entity is configured either as a transmitting UM RLC entity or a receiving UM RLC entity. The transmitting UM RLC entity receives RLC SDUs from upper layer and sends RLC PDUs to its peer receiving UM RLC entity via lower layers. The receiving UM RLC entity delivers RLC SDUs to upper layer and receives RLC PDUs from its peer transmitting UM RLC entity via lower layers. An AM RLC entity consists of a transmitting side and a receiving side. The transmitting side of an AM RLC entity receives RLC SDUs from upper layer and sends RLC PDUs to its peer AM RLC entity via lower layers. The receiving side of an AM RLC entity delivers RLC SDUs to upper layer and receives RLC PDUs from its peer AM RLC entity via lower layers.

In the current LTE/LTE-A system, the main functions of the RLC are as follows:

Segmentation/concatenation and reassembly;
Polling;
RLC status reporting;
Retransmission; and
Resegmentation.

For example, when a transmitting RLC entity forms PDUs from RLC SDUs, it segments and/or concatenates the RLC SDUs so that the PDUs fit within the total size of RLC PDU(s) indicated by lower layer at the particular transmission opportunity notified by lower layer; and includes relevant RLC headers in the PDU. If the transmitting RLC entity supports retransmission of RLC data PDUs (ARQ), the RLC entity can re-segment the RLC data PDU into PDU segments if the RLC data PDU to be retransmitted does not fit within the total size of RLC PDU(s) indicated by lower layer at the particular transmission opportunity notified by lower layer. The number of re-segmentation is not limited. When the transmitting RLC entity supporting retransmission of RLC data PDUs forms PDUs from RLC SDUs received from upper layer or PDU segments from RLC data PDUs to be retransmitted, it includes relavant RLC headers in the RLC data PDU. When a receiving RLC entity receives the PDUs, it detects whether or not the PDUs have been received in duplication, and discard duplicated PDUs; reorders the PDUs if they are received out of sequence; detect the loss of PDUs at lower layers, and avoid excessive reordering delays or request retransmissions to its peer RLC entity; reassemble RLC SDUs from the reordered (data) PDUs (not accounting for RLC PDUs for which losses have been detected) and deliver the RLC SDUs to upper layer in ascending order of the RLC SN; discard received PDUs that cannot be re-assembled into a RLC SDU due to loss at lower layers of an PDU which belonged to the particular RLC SDU. The more detailed descriptions of each function of the RLC may refer to the document 3GPP TS 36.322.

Figure 9:
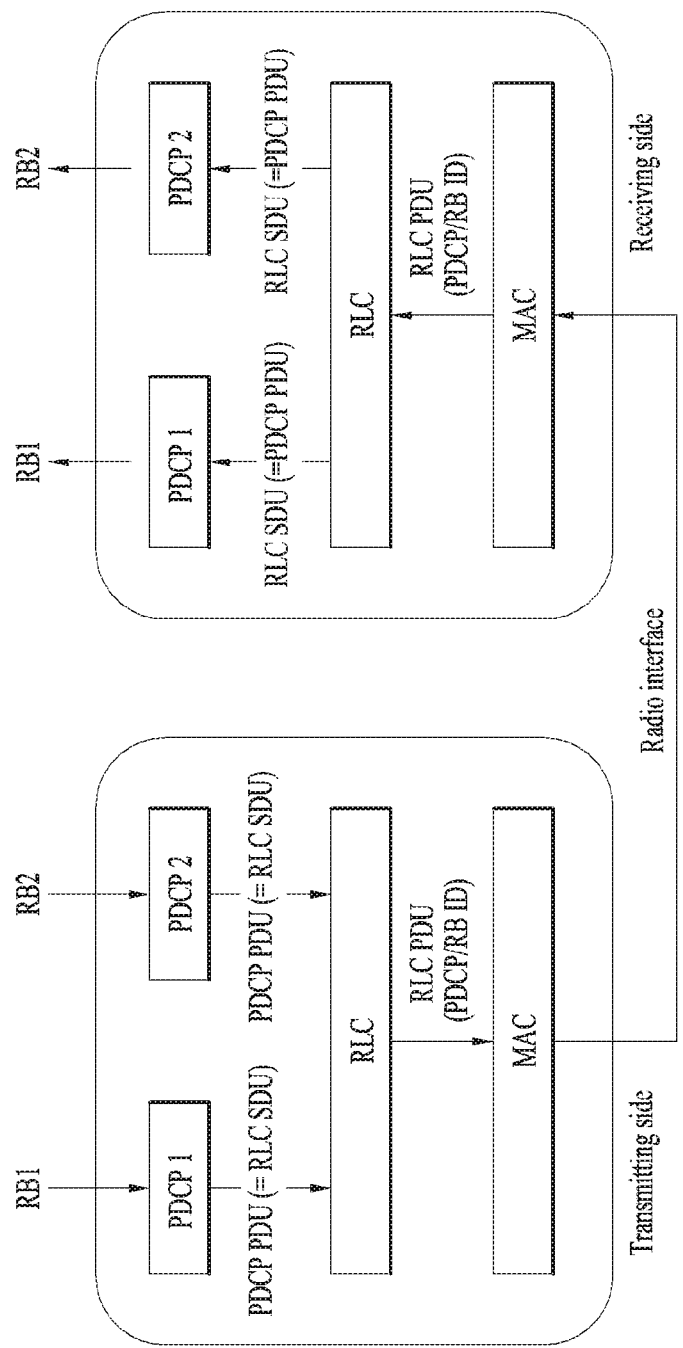
FIG. 9 illustrates methods for transmitting/receiving data units according to the present invention.

FIG. 9 illustrates methods for transmitting/receiving data units according to the present invention.

Hereinafter, embodiments according to the present invention will be described in view of a transmitting side and a receiving side, respectively. In the present invention, it is assumed that the RB and the PDCP has one-to-one mapping relationship.

Section A. Transmitting Side

In a method of the present invention, a PDCP connected to a shared RLC indicates a PDCP ID (or RB ID) to the shared RLC each time it delivers a PDCP protocol data unit (PDCP PDU) (=RLC service data unit (RLC SDU)) to the shared RLC. The PDCP ID (or RB ID) may be included in the PDCP PDU header. Referring to FIG. 9, each of PDCP1 and PDCP2 informs a shared RLC of a PDCP/RB ID associated with a PDCP PDU when it delivers the PDCP PDU to the shared RLC. An indicator indicating presence of the PDCP ID (or RB ID) may be included in the PDCP PDU header or in the RLC PDU header. Referring to FIG. 9, each of PDCP1 and PDCP2 may include a PDCP/RB ID in a header of a corresponding PDCP PDU that the corresponding PDCP delivers to the shared RLC, or the shared RLC receiving a PDCP PDU and a corresponding PDCP/RB ID may include a PDCP/RB ID corresponding to a received PDCP PDU (i.e. received RLC SDU) in a RLC PDU containing the received RLC SDU.

In another method of the present invention, the shared RLC identifies the PDCP entity (or RB) of the PDCP PDU each time it receives a PDCP PDU from one of the PDCPs connected to the shared RLC entity. Then, the shared RLC attaches the PDCP ID (or RB ID) to each PDCP PDU to construct an RLC SDU. An RLC PDU contains one or more RLC SDUs (and/or RLC SDU segment(s)). Referring to FIG. 9, the shared RLC may include an indicator in the RLC PDU header that the RLC SDU contained in the RLC PDU is composed of a PDCP ID (or RB ID) and a PDCP PDU.

The RLC PDU, i.e., the MAC SDU is submitted to a MAC entity associated with the shared RLC entity, and transmitted to a receiving side.

Section B. Receiving Side

A receiving side receives radio signals from a transmitting side. A MAC entity obtains a MAC PDU containing a MAC SDU from the radio signals. The MAC entity delivers the MAC SDU (i.e., RLC PDU) to a shared RLC entity associated with the MAC entity. The shared RLC entity may obtains an RLC SDU from one or more RLC PDUs.

In a method of the present invention, after reassembling an RLC SDU, the shared RLC checks the PDCP ID (or RB ID) corresponding to the RLC SDU to identify the PDCP entity to which it delivers the RLC SDU. Then, the shared RLC delivers the RLC SDU to the identified PDCP entity (PDCP1 or PDCP2). The presence of the PDCP ID in the RLC SDU may be indicated by an indicator included in the RLC PDU header or in the PDCP PDU header. Referring to FIG. 9, the shared RLC entity at a receiving side delivers a RLC SDU to PDCP1 or PDCP2 based on a PDCP/RB ID corresponding to the RLC SDU.

In another method of the present invention, the shared RLC receives an RLC PDU composed of a PDCP/RB ID and a PDCP PDU. The shared RLC removes the PDCP ID (or RB ID) from an RLC SDU, and delivers the RLC SDU to the PDCP entity indicated by the PDCP ID (or RB ID). The presence of the PDCP ID in the RLC SDU may be indicated by an indicator included in the RLC PDU header. Referring to FIG. 9, the shared RLC entity at a receiving side delivers a RLC SDU to PDCP1 or PDCP2 based on a PDCP/RB ID corresponding to the RLC SDU.

Section C. RB Configuration with Shared RLC

When an eNB configures an RB to a UE, it first checks whether the RB can reuse one of RLCs configured already or not. In other words, if a UE receives configuration information for an RB, the UE checks whether there is a preconfigured RLC entity available for the RB based on the configuration information. If the RB can reuse one of a already configured RLCs, the eNB indicates at least one of the followings to the UE when it sends RB configuration message:

The use of shared RLC
The identifier of the shared RLC; and/or
The identifier of the RB(s) that use the shared RLC.

If the RB cannot reuse one of a already configured RLC, the eNB configures a new RLC without indicating shared RLC related information.

When an UE receives an RB configuration message from an eNB, it checks whether at least one of the followings are included in the RB configuration message:

The use of shared RLC
The identifier of the shared RLC; and/or
The identifier of the RB(s) that use the shared RLC.

If the above information is included, the UE links the indicated shared RLC entity for the RB. In other words, if an eNB informs a UE that the UE should reuse an existing RLC entity for a new RB, the UE does not have to configure a new RLC entity dedicated for the new RB but associates the new RB with the existing RLC entity that was configured for another RB before. Otherwise, the UE establishes a new RLC entity for the RB.

If a shared RLC entity is configured or used for different RBs at a UE, the shared RLC entity of the UE can process data of the RBs according to one of methods proposed at "Section A", and the UE can transmit radio signals containing data of the RBs.

If a shared RLC entity is configured or used for different RBs at a UE, a shared RLC entity of a UE can process data of the RBs according to one of methods proposed at "Section B" when the UE receives radio signals containing data of the RBs.

Section D. RB Removal with Shared RLC

An eNB may instruct a UE that the UE release an RB by sending an RB removal message for the RB. When the UE receives the RB removal message for the RB from the eNB, the UE checks whether the RLC of the RB is used by other RBs or not. If the RLC is used by other RBs, the UE removes RB without releasing RLC entity (and MAC/PHY/RF). Otherwise, if the RLC is not used by any other RBs, the UE releases RLC entity when removing the RB.

If the shared RLC is used in sidelink (i.e. D2D), the UE releases the shared RLC entity when the last PDCP entity connected to the shared RLC entity is released. In the same manner as that of the afore-mentioned Uu case where the shared RLC entity is released when the last RB is removed, the shared RLC entity used in sidelink is released when the last RB for the sidelink is removed.

Figure 10:
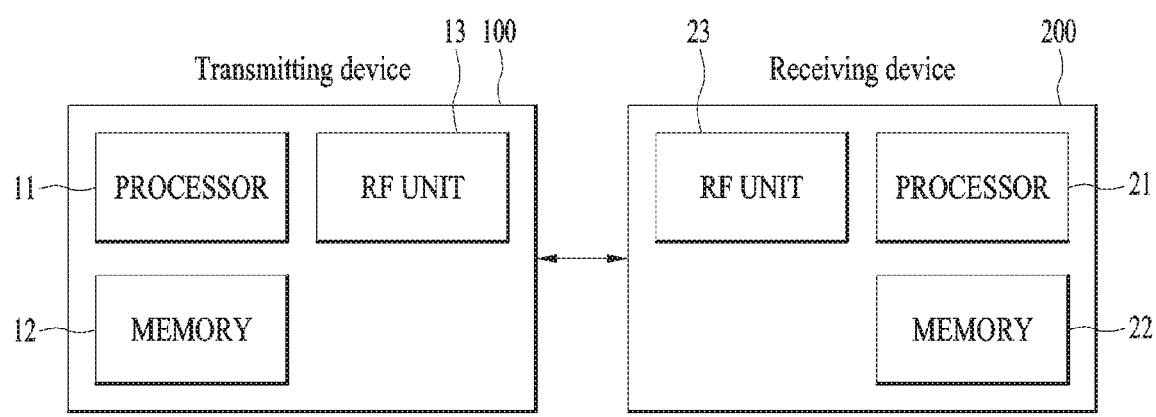
FIG. 10 is a block diagram illustrating elements of a transmitting device 100 and a receiving device 200 for implementing the present invention.

FIG. 10 is a block diagram illustrating elements of a transmitting device 100 and a receiving device 200 for implementing the present invention.

The transmitting device 100 and the receiving device 200 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 100 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 200 is the reverse of the signal processing process of the transmitting device 100. Under control of the processor 21, the RF unit 23 of the receiving device 200 receives radio signals transmitted by the transmitting device 100. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 100 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 200. An RS transmitted through a corresponding antenna defines an antenna from the view point of the receiving device 200 and enables the receiving device 200 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 100 in UL and as the receiving device 200 in DL. In the embodiments of the present invention, an eNB operates as the receiving device 200 in UL and as the transmitting device 100 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The processor 11 of the transmitting device 100 may obtain an RLC SDU or RLC PDU at a shared RLC entity according to Section A of the present invention. The RF unit 13 of the transmitting device 100 transmits radio signals containing the RLC SDU/PDU to the receiving device 100.

The RF unit 23 of the receiving device 200 receives radio signals containing the RLC SDU/PDU from the transmitting device. The processor 21 of the receiving device 200 may obtain an RLC SDU at a shared RLC entity and delivers the RLC SDU to a corresponding PDCP entity according to Section B of the present invention.

The processors 11 and 21 may configure an RLC entity that can be shared by multiple RBs according to Section C of the present invention.

The processors 11 and 21 may remove an RB according to Section D of the present invention.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a network node (e.g., BS), a UE, or other devices in a wireless communication system.

What is claimed is:

1. A method for transmitting, by a user equipment (UE), a data unit in a wireless communication system, the method comprising:
   receiving first configuration information for a first radio bearer (RB) and second configuration information for a second RB from a network device,
   wherein a first packet data convergence protocol (PDCP) entity is configured for the first RB based on the first configuration information, and a second PDCP entity is configured for the second RB based on the second configuration information,
   wherein the first configuration information and the second configuration information include an identifier of a shared radio link control (RLC) entity,
   wherein both the first PDCP entity and the second PDCP entity are associated with the shared RLC entity, and
   wherein the shared RLC entity is associated with a medium access control (MAC) entity;
   receiving, at the shared RLC entity, a PDCP protocol data unit (PDU) from one of the first PDCP entity or the second PDCP entity;
   generating, at the shared RLC entity, a RLC service data unit (SDU) based on the PDCP PDU; and
   submitting, at the shared RLC entity, a RLC PDU containing the RLC SDU to the MAC entity,
   wherein generating the RLC SDU comprises:
   based on the PDCP PDU being received from the first PDCP entity, generating the RLC SDU to contain a first identifier related with the first PDCP entity; and
   based on the PDCP PDU being received from the second PDCP entity, generating the RLC SDU to contain a second identifier related with the second PDCP entity,
   wherein the first identifier is a RB identifier of the first RB, and the second identifier is a RB identifier of the second RB.

2. The method according to claim 1,
   wherein the RLC PDU includes an indicator indicating presence of the first identifier or the second identifier, and
   wherein the indicator is in a header of the RLC PDU.

3. The method according to claim 1, further comprising:
   transmitting a message containing the RLC PDU to the network device.

4. A user equipment (UE) for transmitting a data unit in a wireless communication system, the UE comprising:
   a radio frequency (RF) unit, and
   a processor configured to control RF unit, the processor configured to:
   receive first configuration information for a first radio bearer (RB) and second configuration information for a second RB from a network device,
   wherein a first packet data convergence protocol (PDCP) entity is configured for the first RB based on the first configuration information, and a second PDCP entity is configured for the second RB based on the second configuration information,
   wherein the first configuration information and the second configuration information include an identifier of a shared radio link control (RLC) entity,
   wherein both the first PDCP entity and the second PDCP entity are associated with the shared RLC entity, and
   wherein the shared RLC entity is associated with a medium access control (MAC) entity;
   receive, at the shared RLC entity, a PDCP protocol data unit (PDU) from one of the first PDCP entity or the second PDCP entity;
   generate, at the shared RLC entity, a RLC service data unit (SDU) based on the PDCP PDU; and
   submit, at the shared RLC entity, a RLC PDU containing the RLC SDU to the MAC entity,
   wherein the processor is further configured to generate the RLC SDU by:
   based on the PDCP PDU being received from the first PDCP entity, generating the RLC SDU to contain a first identifier related with the first PDCP entity; and
   based on the PDCP PDU being received from the second PDCP entity, generating the RLC SDU to contain a second identifier related with the second PDCP entity,
   wherein the first identifier is a RB identifier of the first RB, and the second identifier is a RB identifier of the second RB.

* * * * *